United States Patent [19]

Behr

[11] Patent Number: 5,120,389
[45] Date of Patent: Jun. 9, 1992

[54] PIPELINE COATING MACHINE

[76] Inventor: Keith R. Behr, 211 Douglas Ct., Eveleth, Minn. 55734

[21] Appl. No.: 570,502

[22] Filed: Aug. 21, 1990

[51] Int. Cl.⁵ .......................................... B65H 81/06
[52] U.S. Cl. ....................... 156/392; 118/73; 118/405; 118/DIG. 11; 425/62; 425/64; 425/113
[58] Field of Search .............. 118/73, 405, DIG. 11; 405/154-156; 425/59, 62, 64, 113; 156/287, 392

[56] References Cited

U.S. PATENT DOCUMENTS

| | | | |
|---|---|---|---|
| 288,033 | 11/1883 | Detrick | 264/33 |
| 1,988,628 | 1/1935 | McDonald et al. | 118/DIG. 11 |
| 1,990,711 | 2/1935 | Rolfs et al. | 118/75 |
| 2,014,378 | 9/1935 | Gardiner et al. | 118/DIG. 11 |
| 2,053,307 | 9/1936 | Wilson | 425/113 |
| 2,147,308 | 2/1939 | Mickelson et al. | 118/DIG. 11 |
| 2,186,361 | 1/1940 | Bryan et al. | 118/DIG. 11 |
| 2,253,848 | 8/1941 | Cummings | 156/392 |
| 2,253,891 | 8/1941 | Cummings | 242/7.22 |
| 2,344,264 | 3/1944 | Perrault | 156/392 |
| 2,359,751 | 10/1944 | Cummings et al. | 118/405 |
| 2,746,516 | 5/1956 | Cummings | 118/DIG. 11 |
| 2,770,284 | 11/1956 | Myrick | 156/392 |
| 2,990,577 | 7/1961 | Kraffe de Laubarede | 118/DIG. 11 |
| 3,145,444 | 8/1964 | Brown et al. | 405/155 |
| 3,876,355 | 4/1975 | Baughmann | 425/113 |
| 3,941,531 | 3/1976 | Parker | 118/DIG. 11 |
| 4,221,503 | 9/1980 | Cherrington | 405/184 |
| 4,260,351 | 4/1981 | Takano et al. | 425/113 |
| 4,262,627 | 4/1981 | Roeder et al. | 118/72 |
| 4,298,296 | 11/1981 | Hanson | 425/59 |
| 4,335,752 | 6/1982 | Sumner | 405/154 |
| 4,345,854 | 8/1982 | Valantin | 405/155 |
| 4,898,497 | 2/1990 | Behr | 405/154 |

FOREIGN PATENT DOCUMENTS 220981 4/1985 German Democratic Rep. .
225737 8/1985 German Democratic Rep. .

OTHER PUBLICATIONS

*Pipeline Digest*, vol. XV, No. 19; Oct. 2, 1978; pp. 1 and 3.
*Pipeline Digest*, Special Edition, Advertisement; p. 9.

Primary Examiner—Jay H. Woo
Assistant Examiner—Robert B. Davis
Attorney, Agent, or Firm—Palmatier & Sjoquist

[57] ABSTRACT

A machine for compressively applying an outer cementitious coating received from a pressurized source on a continuous pipeline as well as on pipeline segments includes a cementitious material accumulating chamber with an aperture for receiving the pipeline thereinto. An injection manifold is in flow communication with the pressurized cementitious coating source and is oriented about and in flow communication with the accumulating chamber for evenly delivering the cementitious coating about the pipeline in the accumulating chamber. A frustoconical compression chamber having a wide and a narrow diameter concentrically joins the accumulating chamber at its wide diameter for receiving the pipeline and compressing the cementitious coating about and onto the pipeline. A forming chamber is concentrically oriented and adjoining the compression chamber at its narrow diameter for troweling and finishing the cementitious coating also having a coated pipeline exit aperture.

27 Claims, 7 Drawing Sheets

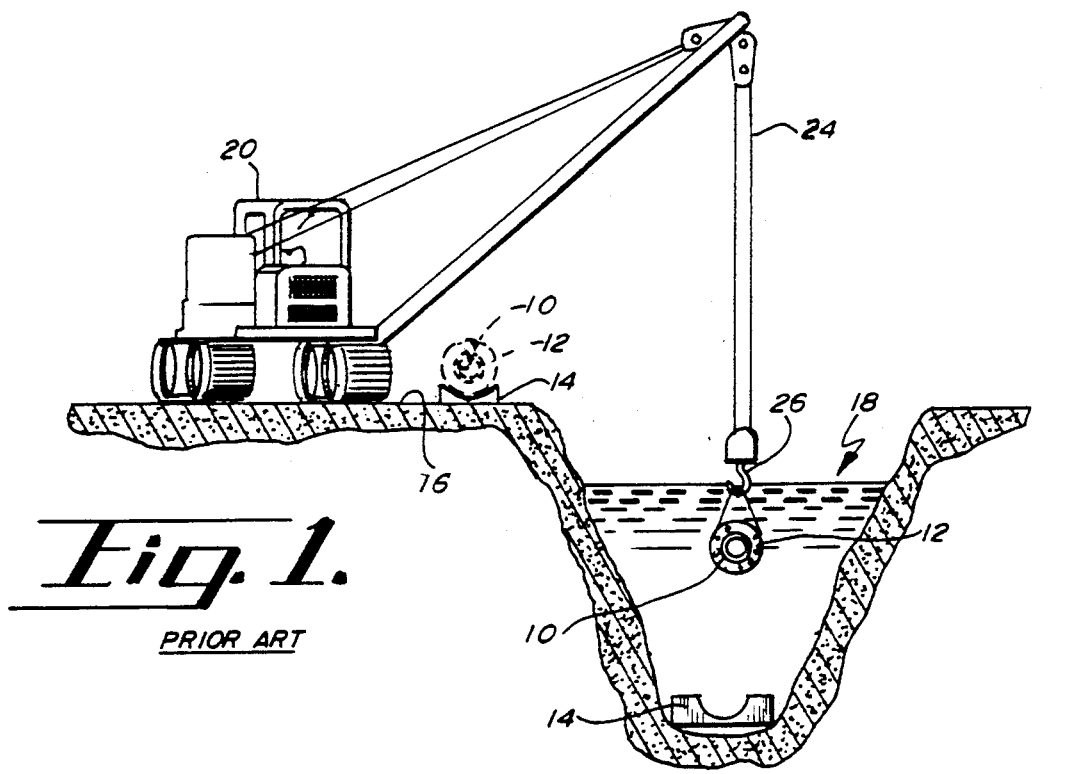
Fig. 1.
PRIOR ART
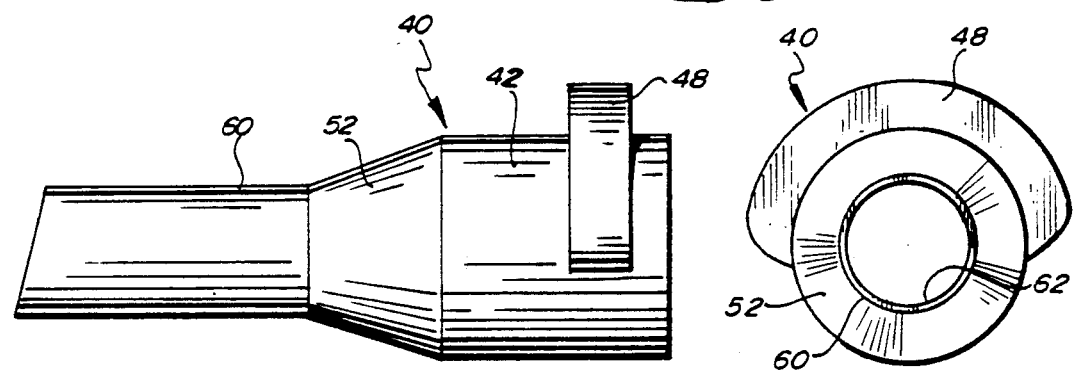
Fig. 3.
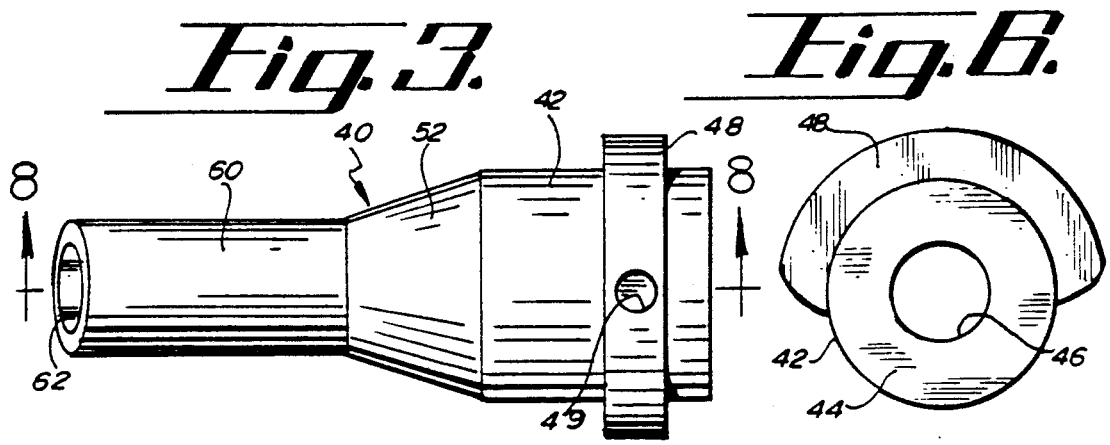
Fig. 6.
Fig. 4.
Fig. 7.

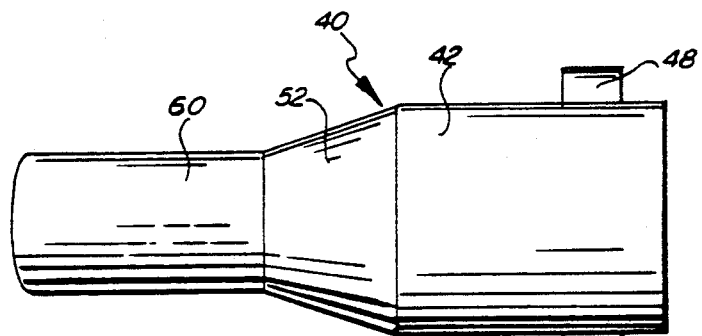
Fig. 5.
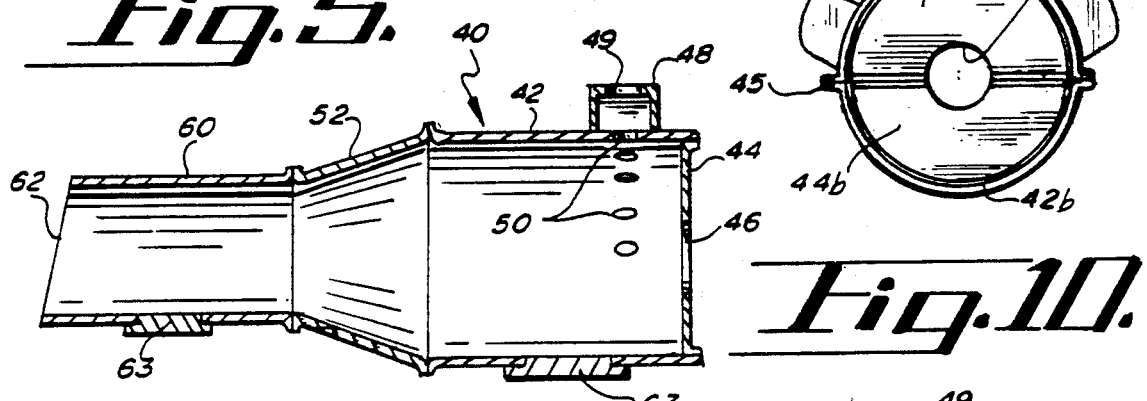
Fig. 10.
Fig. 8.
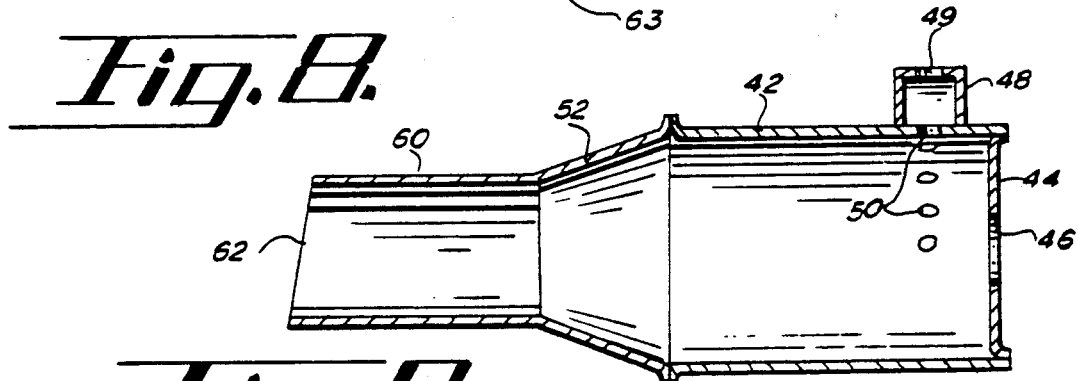
Fig. 9.
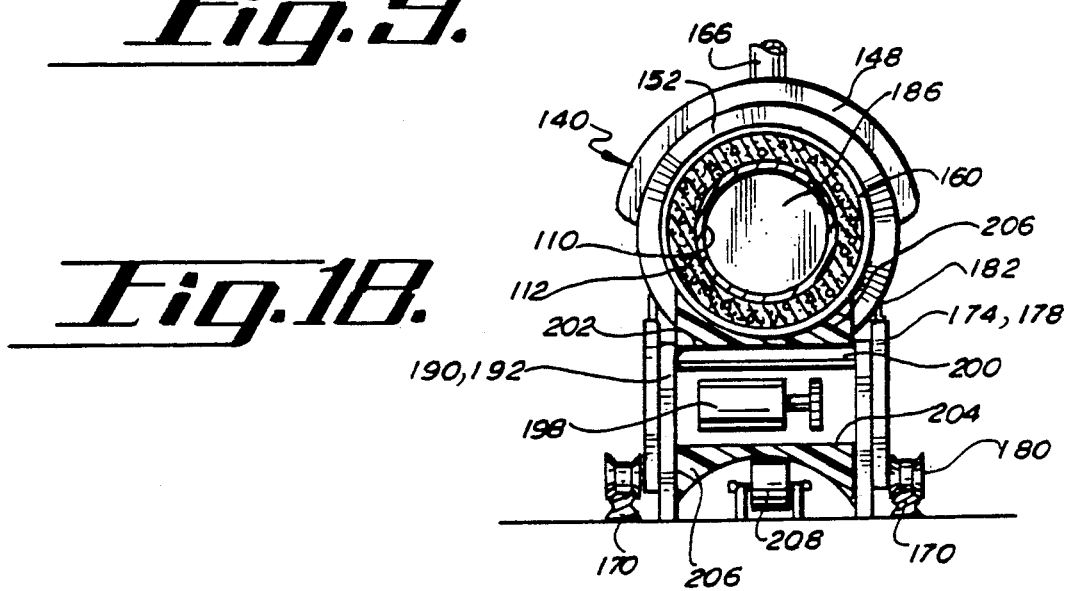
Fig. 18.

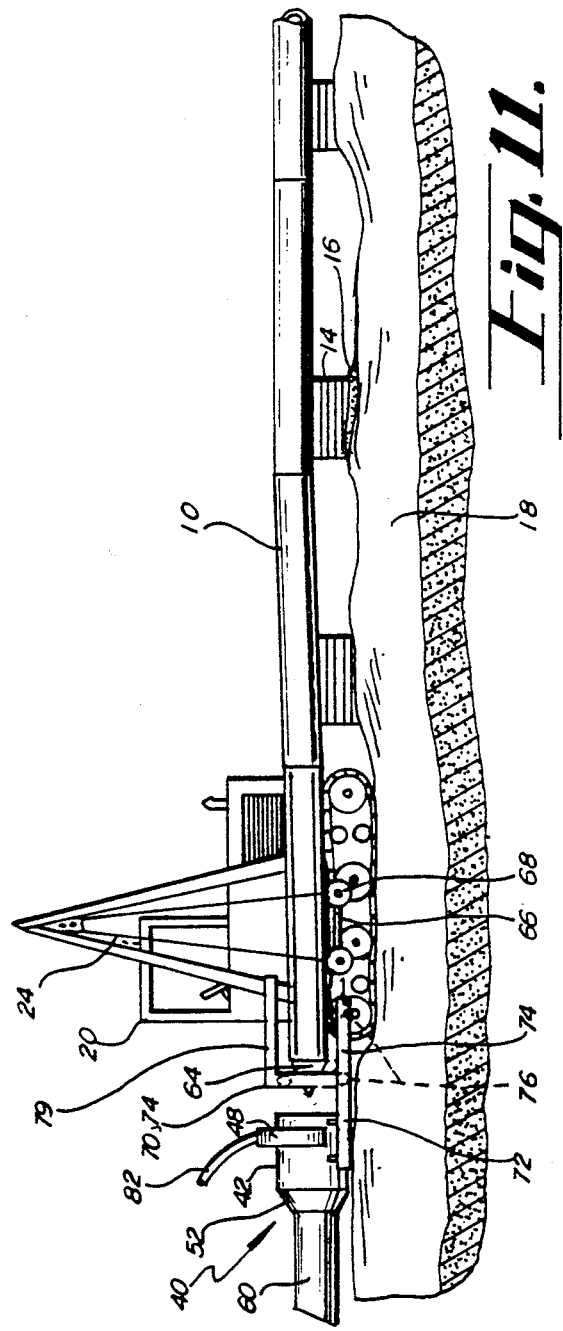
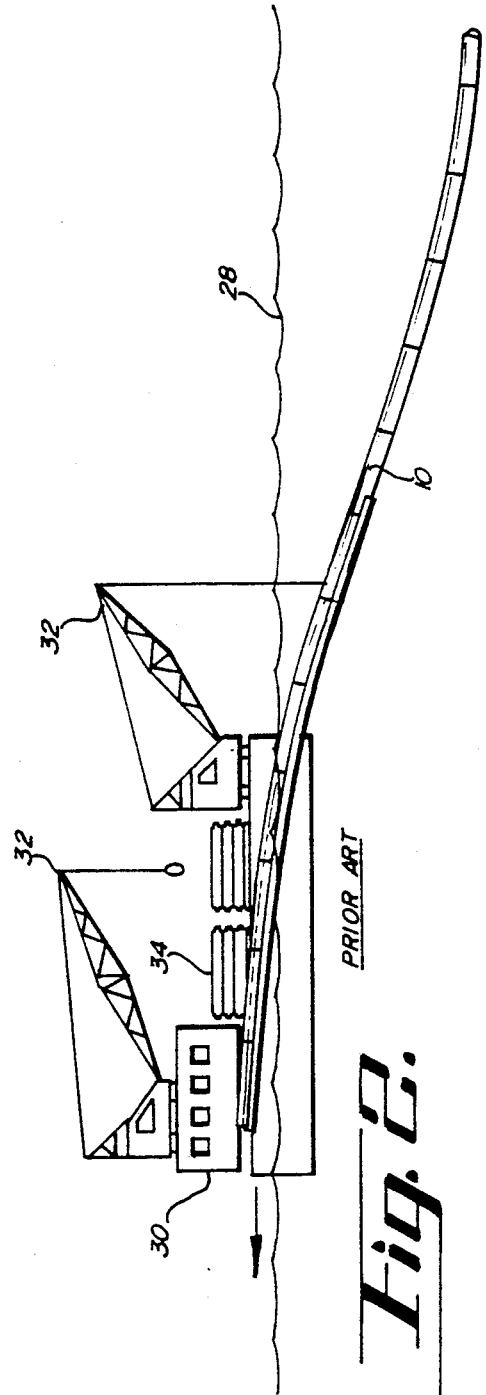

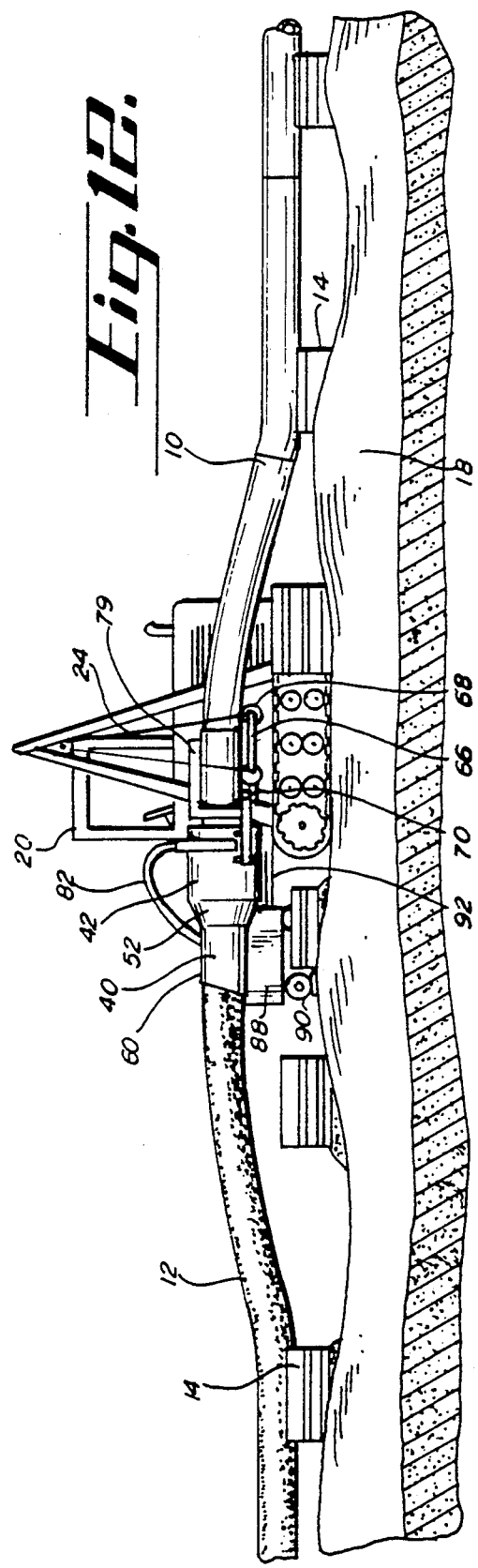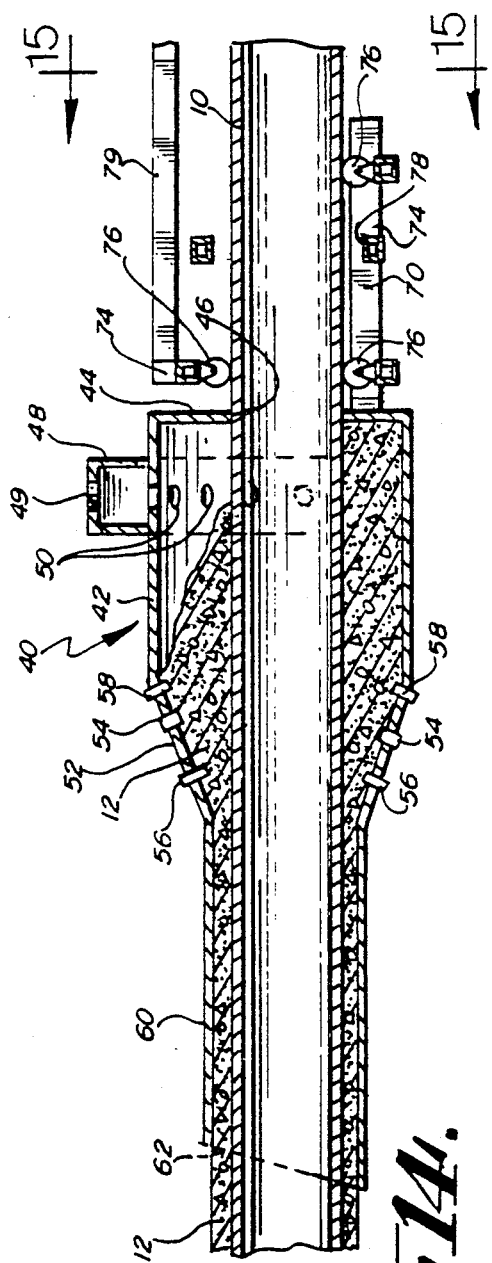

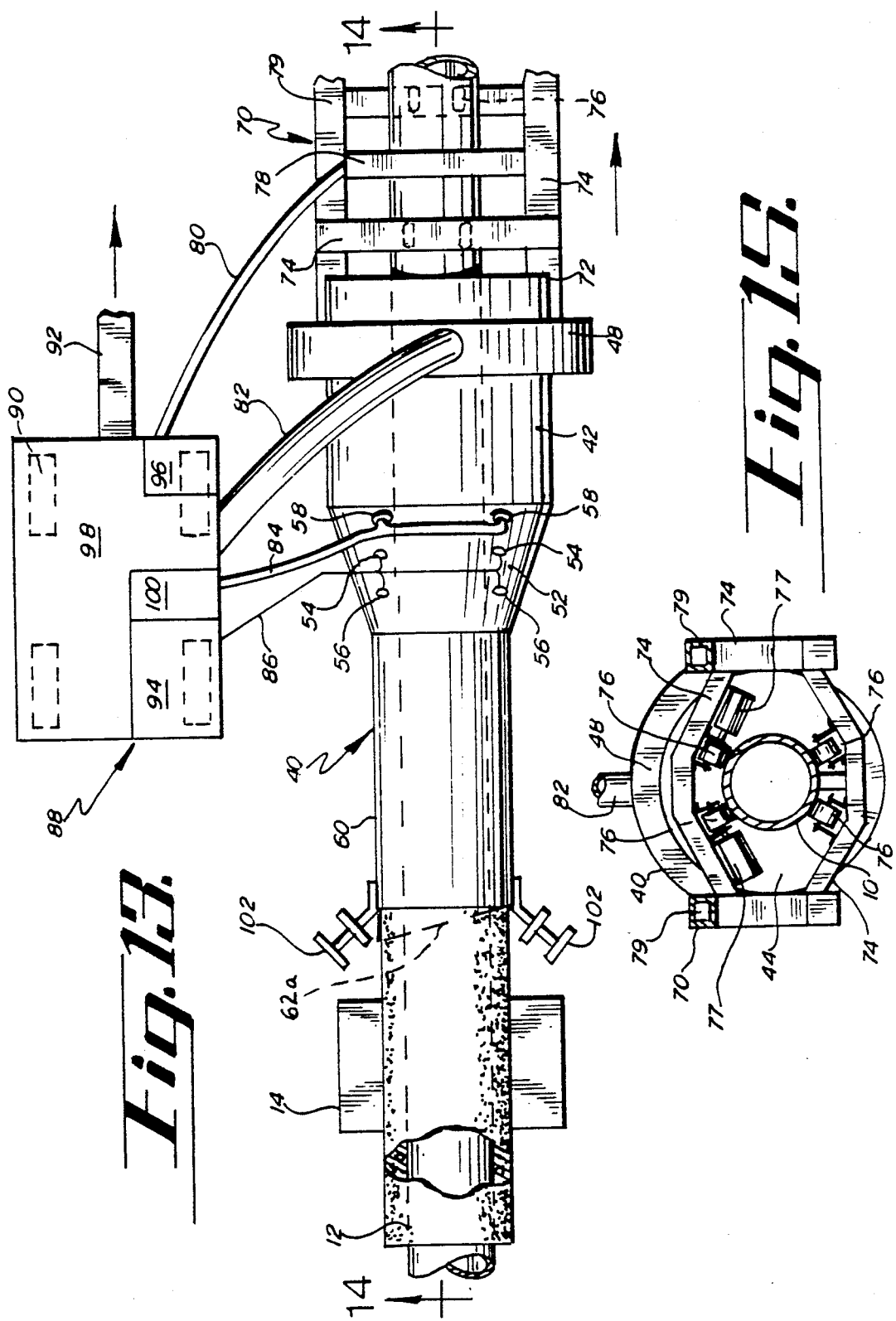

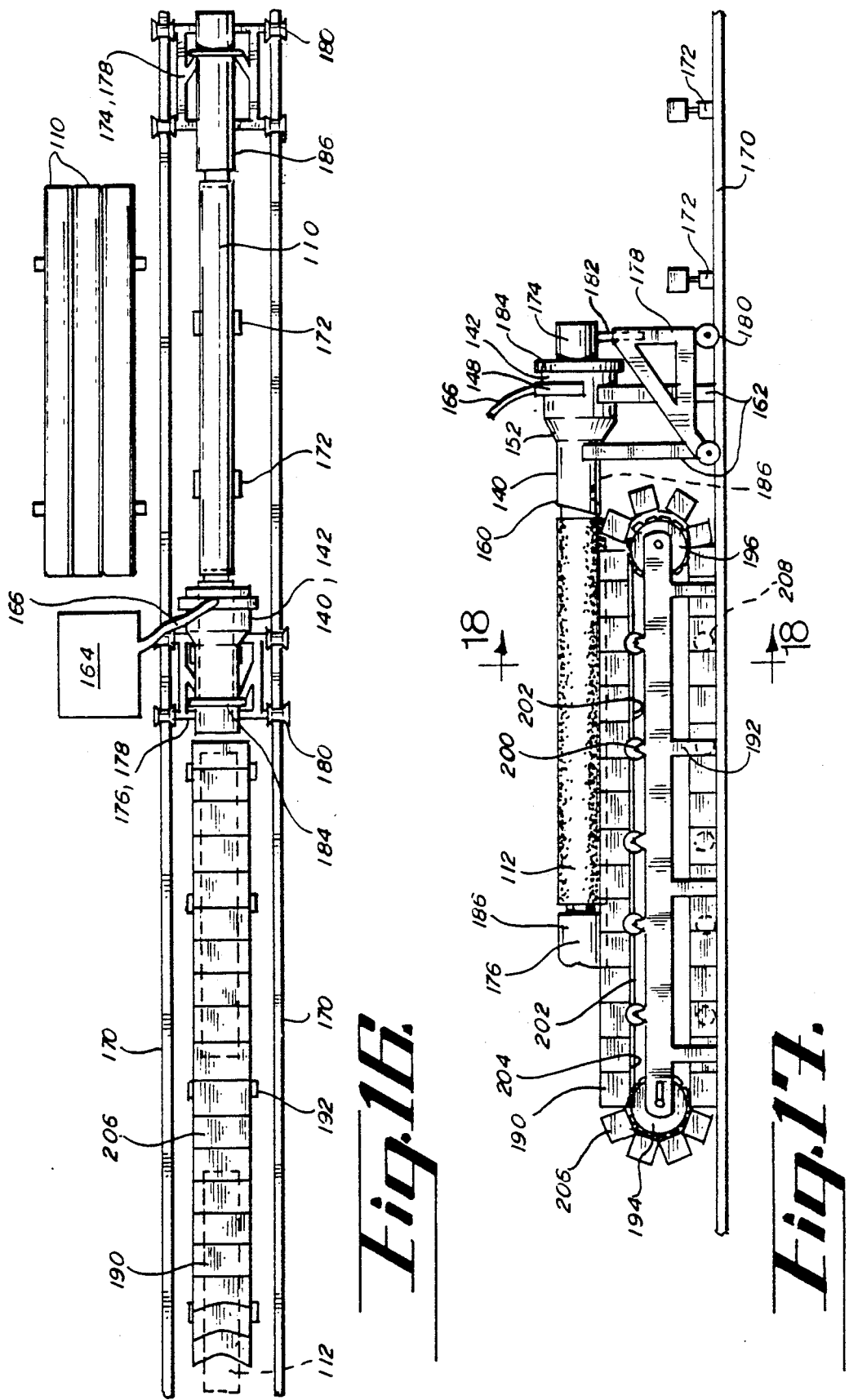

PIPELINE COATING MACHINE

BACKGROUND OF THE INVENTION

This invention relates to a pipeline coating machine. More particularly, the invention is a machine which receives pressurized cementitious coating and which applies the coating to the pipeline by compression due to the unique structure of the machine.

The stringing or connecting of various diameter pipeline segments into literally miles and miles of pipeline for use in transporting petroleum products and other fluids is well known. Usually the pipeline is buried along its right-of-way. Occasionally large bodies of water or wet lands, including rivers, streams, lakes, seas and marshes, must be traversed by the pipeline. When this is the case, protective steps must be taken to prevent the pipeline from buoying up in the wet environment. Often weight is attached to the pipeline or a weight coating such as with a cementitious material, is applied to the pipeline. Cementitious coatings have been applied to pipeline by impingement sprayed onto a rotating pipe which is thereafter taped with a polyethylene tape which compresses and holds the cementitious material or coating to the pipe.

Referring to FIGS. 1 and 2, after the pipeline 10 has been weighted by a cementitious coating 12, the pipeline 10 is lifted from its form 14 on the ground 16 and lowered into the ditch, river bed or swamp 18, by a pipe layer or side boom 20 by way of cable 24 and hook and strap 26.

When a pipeline is to cross a lake or sea 28, the pipeline is laid by barge 30 having a downwardly extending stinger. The barge 30 typically includes cranes 32 and pipes or pipeline segments 34 which are connected thereby forming pipeline 10.

The problems associated with weight coating on pipelines are quite obvious. It is difficult to get the coating to stick to the pipeline thereby often requiring a tape to be applied to the uncured cementitious coating. Also, the pipeline must be supported during the setting up, curing and drying process of the cementitious coating. Next, the pipeline must be transported and strung or connected together in the field.

There is a need for a pipeline coating machine that is light weight and easily transportable to and from the right-of-way. Such a machine should be simple in that it is easy to assemble, disassemble, clean and maintain as well as being readily adjustable for various sizes of pipeline and thickness of cementitious coating.

SUMMARY OF THE INVENTION

A machine for compressively applying an outer cementitious coating received from a pressurized source on a continuous pipeline as well as on pipeline segments includes a cementitious material accumulating chamber with an aperture for receiving the pipeline thereinto. An injection manifold is in flow communication with the pressurized cementitious coating source and is oriented about and in flow communication with the accumulating chamber for evenly delivering the cementitious coating about the pipeline in the accumulating chamber. A frustoconical compression chamber having a wide and a narrow diameter concentrically joins the accumulating chamber at its wide diameter for receiving the pipeline and compressing the cementitious coating about and onto the pipeline. A forming chamber is concentrically oriented and adjoining the compression chamber at its narrow diameter for troweling and finishing the cementitious coating also having a coated pipeline exit aperture.

The principal object and advantage of the present invention is that the machine is lightweight and easily transportable to and from the pipeline right-of-way (row) whereat a cementitious coating may be applied by the machine onto the pipeline.

Another object and advantage of the present machine is that it is quite simple in that it is easy to assemble, disassemble, clean and maintain as well as operate.

Another advantage and object of the present invention is that the machine has no moving parts excepting only that the chambers may be interchanged with chambers of various diameters to accommodate variances in the thickness of the cementitious coating and pipeline diameter.

Another object and advantage of the present invention is that the machine readily lends itself to either a transportable field usage as well as stationary yard application which may be used in conjunction with a form conveyor.

BRIEF DESCRIPTION OF THE DRAWINGS

FIG. 1 is a view of a pipe layer or side boom placing a coated pipeline into a river bed;

FIG. 2 is a barge laying coated pipeline onto the bottom of a sea;

FIG. 3 is a side elevational view of the pipeline coating machine;

FIG. 4 is a top plan view of the pipeline coating machine;

FIG. 5 is a bottom view of the pipeline coating machine;

FIG. 6 is a rear elevational view of the modified machine;

FIG. 7 is a front elevational view of the machine;

FIG. 8 is a cross sectional view taken along lines 8—8 of FIG. 4 showing the machine in modified segmented chamber form;

FIG. 9 is another cross sectional view similar to FIG. 8 showing the machine in yet another modified segmented chamber form;

FIG. 10 is a front elevational view similar to FIG. 7 showing the machine in longitudinal segmented form for application of machine onto a continuous pipeline;

FIG. 11 is a side elevational view of the pipeline coating machine being mounted onto a pipeline;

FIG. 12 is a side elevational view of the pipeline coating machine coating a pipeline with cementitious material;

FIG. 13 is a top plan view of the machine shown coating a pipeline;

FIG. 14 is a cross sectional view taken along lines 14—14 of FIG. 13;

FIG. 15 is a cross sectional view taken along lines 15—15 of FIG. 14;

FIG. 16 is a top plan view of the pipeline coating machine mounted in a yard with its form conveyor;

FIG. 17 is a side elevational view of the machine coating a pipeline segment together with its form conveyor; and FIG. 18 is a cross sectional view taken along lines 18—18 of FIG. 17.

DESCRIPTION OF THE PREFERRED EMBODIMENT

Figure 3A:
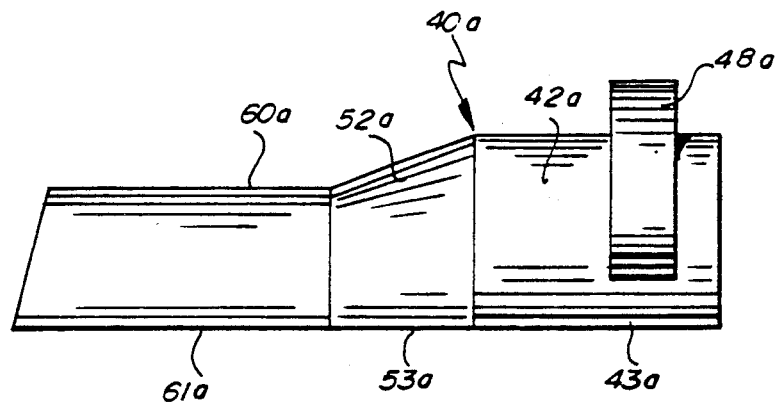
FIG. 3A is a side elevational view of a modified pipeline coating machine.

Referring to FIGS. 3-7, pipeline coating machine 40 is generally cylindrical in shape with a tapered intermediate section. That is, the coating machine 40 generally includes its accumulating chamber 42, frustoconical compression chamber 52 and forming chamber 60 all of which are concentric along center line "C".

Accumulating chamber 42 is cylindrical having a front end wall 44. Wall 44 has an aperture 46 through which the pipeline or pipeline segments may be passed into the machine 40 for coating. Partially about accumulating chamber 42 is injection manifold or header 48. Manifold 48 includes its feed opening 49 which is in flow communication with the pressurized cementitious coating source. Manifold 48 also has accumulating chamber openings 50 through which the cementitious material 12 may pass (FIGS. 8 and 9). Integrally connected to accumulating chamber 42 is compression chamber 52 which is tapered or frustoconical in shape to assist in compressing the cementitious coating 12 onto the pipeline 10 as it passes through the coating machine 40. As shown in FIGS. 13 and 14, compression chamber 52 suitably has pressure sensors 54 and of known pressure transducer construction.

Compression chamber 52 also may have vibrators 56 and accelerator jets 58. Connected to the narrow diameter portion of compression chamber 52 is forming chamber 60 which has an aperture 62 therein which is also concentric therewith and through which the coated pipeline 10 may exit. Aperture 62 may be canted or obliquely oriented top to bottom (62 in FIG. 8) and/or side to side (62a in FIG. 13) which will readily permit the coated pipeline 10 to be wrapped with tape as it exits aperture 62.

Figures 6A, 7A:
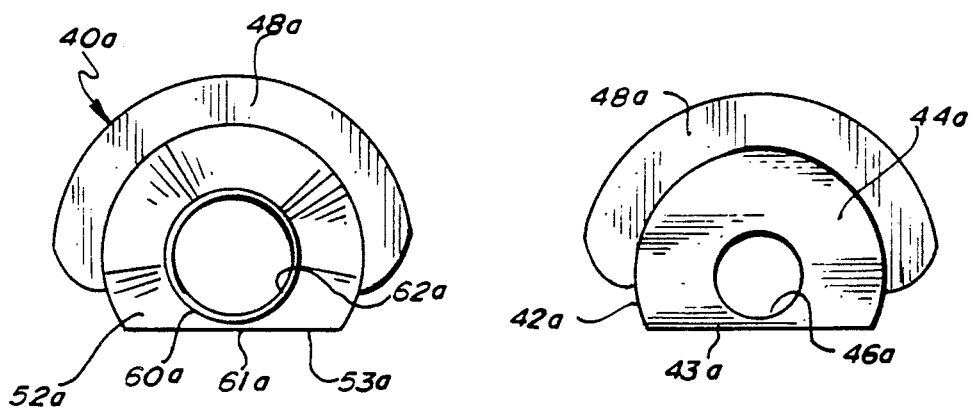
FIG. 6A is a rear elevational view of the modified machine.
FIG. 7A is a front elevational view of the modified machine.

Referring to FIGS. 3A, 6A and 7A, a modified pipeline coating machine 40a may be viewed and understood. All components are similar to the components of machine 40 with the additional designation of "a". However, the bottom most portions 43a, 53a, and 61a of chambers 42a, 52a, and 60a of modified machine 40a are all in a common plane as seen in FIG. 3A. This construction may avoid a dead volume of cementitious coating 12 from sitting in bottom of chambers 42a and 52a below pipeline 10 and not moving through machine 40a and out exit aperture 62a.

Referring to FIGS. 8, 9 and 10, the pipeline coating machine 40 may be segmented and interconnectable such as by the bolting together of accumulating chamber 42, compression chamber 52 and forming chamber 60 in various arrangements. FIG. 9 shows compression chamber 52 and forming chamber 60 being integral and unitary while they are both bolted on to the accumulating chamber 42. This arrangement permits the coating machine 40 to be readily adaptable and adjustable for various sizes of pipeline 10 and as well as thicknesses of cementitious coating 12 to be applied to pipeline 10. Alternatively, as shown in FIGS. 3-7, pipeline coating machine 40 may be integral and unitary such as by welding the chambers 42, 52 and 60 together when they are made out of metal such as steel, iron or aluminum. Coating machine 40 may also have clean out doors 63 which permit the operator to clean out the coating machine 40 thoroughly to assure that no cementitious coating 12 remains within the machine and hardens.

Referring to FIG. 10, the coating machine 40 may be longitudinally segmented in that the chambers 42, 52 and 60 together with front end wall 44 may be segmented into upper and lower halves along the center line "C" of FIG. 3 that are interconnected by hinge 45. Hinge 45 uniquely permits the pipeline coating machine 40 to be opened up, placed about an existing continuous pipeline 10 to be coated, closed and secured for coating pipeline 10.

Referring to FIGS. 11-15, the set up and operation of pipeline coating machine 40 may be understood and appreciated. Initially, a bull plug 64 may be placed into the end of pipeline 10 when the pipeline 10 is not continuous. Pipeline 10 may be supported by pipe cradle 66 which has wheels 68 for supporting the bottom portions of the pipeline 10 after it is lifted from supports 14 by cradle 66. Thereafter, pipeline coating machine 40 is lifted up by perhaps a side boom and guided onto pipeline 10 as bull plug 64 is guided therethrough.

Machine carriage 70 consists of a machine support member 72 fastened to coating machine 40 having pipe guide members 74. Guide members 74 support rollers 76 which permit the machine 40 to be supported upon pipeline 10 in a concentric manner. A drive and/or brake system may be used that is driven by motor 77 connected to rollers 76. Carriage 70 may also have a bonding agent application housing 78. A bonding agent will assist the cementitious coating 12 in adhering to pipeline 10 and such agents may be obtained from Grace Construction Products, 62 Whittemore Avenue, Cambridge, Mass. 02140. Carriage 70 also includes bridle 79 which extends forward of the coating machine 40 and carriage 70 on both sides of one or both cables 24 of side boom 20 to assure that machine 40 does not rotate or tip sideways once it is operating upon pipeline 10.

Referring specifically to FIGS. 12, 13 and 14, machine 40 is connected to control supply and pump vehicle 88 which is supported by tracks, runners or wheels 90 and has a tow bar 92 connected to the pipe layer 20. Vehicle 88 has a control station 94 which may or may not be computerized. Vehicle 88 has a bonding agent supply and pump 96 for delivering the bonding agent through supply hose 80 to application housing 78 whereat the bonding agent may be sprayed on to pipeline 10. However, bonding agent supply and pump 96 may also be mounted on machine 40. Vehicle 88 also has a coating supply and pump 98 which receives cementitious coating 12 from a separate vehicle such as a cement truck. Coating supply and pump 98 is in flow communication with accumulating chamber 42 by way of coating supply hose 82. Vehicle 88 also may have an accelerator supply and pump 100 which may pump accelerator through jets 58 by way of accelerator supply hose 84 to shorten the setting time and boost early strength of the cementitious coating 12 as it leaves coating machine 40 through forming chamber 60. Accelerators may also be obtained from the Grace Construction Products company.

As is known, tape wrappers 102 may be movably mounted or affixed rearwardly of chamber 60 or mounted at the end of forming chamber 60 to dispense either plastic or paper tape as well as wire mesh to further protect and add strength to the cementitious coating 12. For this reason, exit aperture 62 or 62a may be canted or oblique.

In operation, pipeline coating machine 40 supported by machine carriage 70 travels along pipeline 10 by way of motor 77 and rollers 76. A bonding agent may be applied to pipeline 10 at housing 78. Bridle 79 assures that machine 40 remains upright. Pressure sensors 54 assure that the proper pressurized amount of cementitious coating 12 is within machine 40. If such is not the case, the motor 77 and rollers 76 will halt until the pressure level has been resumed. Vibrators 56 may also be used to further compact and increase the density of the cementitious coating 12. As the pipeline coating machine 40 moves along pipeline 10, control supply and pump vehicle 88 is towed along adjacent the machine 40 as pipe layer 20 supports the pipe by way of pipe cradle 66. After the pipe has been coated, it may be placed upon forms 14. After the coated pipeline 10 has cured and set, the pipeline 10 may be lowered to the river bed.

Referring to FIGS. 16-18, a modified pipeline coating machine 140 that is stationary and mounted in a yard may be seen. Machine 140 includes an accumulating chamber 142, injection manifold 148, compression chamber 152 and forming chamber 160 much similar to the respective elements of portable machine 40. Stationary machine 140 is mounted on supports 162. Adjacent the machine 140 is a control, supply and pump station 164 which may be connected to machine 140 by various forms of hoses or wires 166 as previously discussed.

On the ground on both sides of coating machine 140 are located rails 170 with stationary jacks 172 located therebetween and adjacent the stacked pipeline segments 110. Carts 174 and 176 are mounted on rails 170, on either side of machine 140 and carry the pipeline segments 110 through the coating machine 140.

Cart 174 includes a frame 178 mounted on wheels 180 which roll on rails 170. Frame 178 may have a hydraulic lift or telescopic section 182 which supports a push plate 184 and an elongate pipe lifting member 186 which is cylindrical and at least of the length of the stationary coating machine 140 and of a similar diameter of the cementitious coating 112 to be applied to the pipeline segments 110. It may be appreciated that pipe lifting members 186 receive the pipeline segment 110 from elevated jacks 172 and are of a length so that they may pass through coating machine 140 so that a tunnel in the cementitious coating 112 within the machine 140 is constantly maintained as is shown in FIG. 14.

Rearward of pipeline coating machine 140 is a form conveyor 190 which has a frame 192 which supports an idler sprocket 194 which is adjustable for slack and also supports a drive sprocket 196. A drive motor or means 198 moves drive sprocket 196. The frame 192 also supports rollers 200 and form supports 202 which further support the endless conveyor 204 which is wrapped about sprockets 194 and 196. The endless conveyor 204 supports coated pipe or pipeline forms 206 which are generally concave in cross section and bottom support wheels 208 keep forms 206 off the ground.

In operation, carts 174 and 176, by way of their lifting members 186, pick up a pipeline segment 110 off of elevated jacks 172 (FIG. 16). Thereafter, carts 174 and 176 proceed to move the pipeline segment through the coating machine 140. As the pipeline segment 110 passes through the machine 140 with its uncured cementitious coating 112, forms 206 may receive the pipe and support the delicate cementitious coating 112 until it has had ample opportunity to set and harden. Cart 176 may straddle form conveyor 190. It may be appreciated that form conveyor 190 may be extensively long to receive and support multiples of pipeline segments 110.

Form conveyor 190 may take the arrangement of forms 206 being interconnected, such as by belt or conveyor 204. Conveyor 204 is then supported by rollers 200 and form supports 202. Conveyor 204 may then receive coated pipeline segments 110 and be moved relative to machine 140 by action of cart 176 being connected to conveyor 204 as shown by contact in FIG. 17.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. A machine for compressively applying an outer cementitious coating received from a pressurized source on either a continuous pipeline or pipeline segments, comprising:
   (a) an accumulating chamber with an aperture for receiving the pipeline thereinto;
   (b) an injection manifold in flow communication with the pressurized cementitious coating source oriented about and in flow communication with the accumulating chamber for evenly delivering the cementitious coating about the pipeline in the accumulating chamber; and
   (c) a frustoconical compression chamber having a wide and a narrow diameter adjoining the accumulating chamber at its wide diameter for concentrically receiving the pipeline and compressing the cementitious coating about and onto the pipeline;
   (d) an accelerator jet mounted substantially close to the compression chamber; and
   (e) a forming chamber concentric with and adjoining the compression chamber at its narrow diameter for troweling and finishing the cementitious coating with a coated pipeline exit aperture.

2. The machine of claim 1, wherein all the chambers are concentric with one another.

3. The machine of claim 1, wherein the chambers are integral and unitary made from metal.

4. The machine of claim 1, wherein at least two of the chambers are releasably interconnectable and thereby adjustable for coating various sizes of pipeline with different thicknesses of the coating.

5. The machine of claim 1, where the chambers have releasably interlockable upper and lower halves to permit placement of the machine on a continuous pipeline.

6. The machine of claim 1 further comprising a machine carriage fastened to the machine having pipe guide members with sliding means to moveably mount the machine onto a continuous pipeline for uniformly coating the pipe.

7. The machine of claim 6, wherein the sliding means comprises rollers mounted on the pipe guide members.

8. The machine of claim 6, further comprising a drive means mounted on the machine carriage to move the machine along the pipeline.

9. The machine of claim 1, comprising a means mounted forward of the machine for applying a bonding agent to the pipeline.

10. The machine of claim 1, further comprising tape wrappers mounted rearwardly of the forming chamber adjacent the exit aperture.

11. The machine of claim 1, wherein the pipeline exit aperture is obliquely oriented outwardly and downwardly.

12. The machine of claim 1, further comprising a pressure sensor mounted in the compression chamber.

13. The machine of claim 1, further comprising a vibrator mounted in the compression chamber.

14. The machine of claim 1, further comprising a form conveyor having a frame with an idler sprocket, drive sprocket and drive motor for moving a conveyor with coated pipeline supports for receiving and supporting coated pipe exiting from the machine.

15. A portable machine for compressively applying an outer cementitious coating received from a pressurized source onto a pipeline, comprising:
   (a) an accumulating chamber having a front end wall with a concentric pipeline receiving aperture therein and a cementitious coating injection manifold at least partially about the accumulating chamber and opening into the accumulating chamber, the manifold being in flow communication with the coating pressurized source;
   (b) a frustoconical compression chamber having a wide diameter whereat the compression chamber adjoins the accumulating chamber and a narrow chamber for receiving the pipeline and compressing the cementitious coating about and onto the pipeline;
   (c) an accelerator jet mounted substantially close to the compression chamber; and
   (d) a forming chamber with and adjoining the compression chamber at its narrow chamber for troweling and finishing the cementitious coating with a coated pipeline exit aperture.

16. The portable machine of claim 15, wherein all the chambers are concentric with one another.

17. The portable machine of claim 15, wherein the chambers are integral and unitary made from metal.

18. The portable machine of claim 15, wherein the chambers are releasably interconnectable and thereby adjustable for coating various sizes of pipeline with different thicknesses of the coating.

19. The portable machine of claim 15, wherein the chambers have releasably interlockable upper and lower halves to permit placement of the machine on a continuous pipeline.

20. The portable machine of claim 15 further comprising a machine carriage fastened to the machine having pipe guide members with sliding means to moveably mount the machine onto a continuous pipeline for uniformly coating the pipe.

21. The portable machine of claim 20, wherein the sliding means comprises rollers mounted on the pipe guide members.

22. The portable machine of claim 15 further comprising a means mounted forward of the machine for applying a bonding agent to the pipeline.

23. The portable machine of claim 15 further comprising tape wrappers mounted rearwardly of the forming chamber adjacent the exit aperture.

24. The portable machine of claim 15, wherein pipeline exit aperture is obliquely oriented.

25. The portable machine of claim 15 further comprising a pressure sensor mounted in the compression chamber.

26. The portable machine of claim 15 further comprising a vibrator mounted in the compression chamber.

27. The portable machine of claim 15 further comprising a form conveyor having a frame with an idler sprocket, drive sprocket and drive motor for moving an endless conveyor with coated pipe supports for receiving coating pipe exiting from the machine.

* * * * *